(12) United States Patent
Gupta Hyde et al.

(10) Patent No.: US 11,599,750 B2
(45) Date of Patent: Mar. 7, 2023

(54) EDGE DEVICES UTILIZING PERSONALIZED MACHINE LEARNING AND METHODS OF OPERATING THE SAME

(71) Applicant: Intel Corporation, Santa Clara, CA (US)

(72) Inventors: Maruti Gupta Hyde, Portland, OR (US); Florence Pon, Folsom, CA (US); Naissa Conde, San Jose, CA (US); Xue Yang, San Jose, CA (US); Wei Yee Koay, Bayan Lepas (MY)

(73) Assignee: Intel Corporation, Santa Clara, CA (US)

( * ) Notice: Subject to any disclaimer, the term of this patent is extended or adjusted under 35 U.S.C. 154(b) by 1196 days.

(21) Appl. No.: 16/146,860

(22) Filed: Sep. 28, 2018

(65) Prior Publication Data

US 2019/0050683 A1 Feb. 14, 2019

(51) Int. Cl.
| | | |
|---|---|---|
| *G06K 9/62* | (2022.01) | |
| *G06N 20/00* | (2019.01) | |
| *G06V 10/00* | (2022.01) | |
| *G06F 21/62* | (2013.01) | |
| *G06N 3/08* | (2023.01) | |
| *H04L 9/40* | (2022.01) | |
| *G06V 10/94* | (2022.01) | |

(52) U.S. Cl.
CPC ....... *G06K 9/6257* (2013.01); *G06F 21/6245* (2013.01); *G06F 21/6254* (2013.01); *G06K 9/6261* (2013.01); *G06K 9/6269* (2013.01); *G06N 3/08* (2013.01); *G06N 20/00* (2019.01); *G06V 10/95* (2022.01); *H04L 63/0421* (2013.01)

(58) Field of Classification Search
CPC ...... G06K 9/6257; G06N 20/00; G06V 10/95; G06F 21/6245; H04L 63/0421
USPC .......................................................... 706/12
See application file for complete search history.

(56) References Cited

U.S. PATENT DOCUMENTS

| | | |
|---|---|---|
| 9,565,521 B1 * | 2/2017 | Srinivasan ........ H04M 1/72457 |
| 2019/0042878 A1 * | 2/2019 | Sheller ................. G06K 9/6269 |
| 2019/0086988 A1 * | 3/2019 | He .......................... G06F 1/3215 |

\* cited by examiner

*Primary Examiner* — Jeffery A Williams
(74) *Attorney, Agent, or Firm* — Hanley, Flight & Zimmerman, LLC

(57) ABSTRACT

Edge devices utilizing personalized machine learning and methods of operating the same are disclosed. An example edge device includes a model accessor to access a first machine learning model from a cloud service provider. A local data interface is to collect local user data. A model trainer is to train the first machine learning model to create a second machine learning model using the local user data. A local permissions data store is to store permissions indicating constraints on the local user data with respect to sharing outside of the edge device. A permissions enforcer is to apply permissions to the local user data to create a sub-set of the local user data to be shared outside of the edge device. A transmitter is to provide the sub-set of the local user data to a public data repository.

28 Claims, 7 Drawing Sheets

EDGE DEVICES UTILIZING PERSONALIZED MACHINE LEARNING AND METHODS OF OPERATING THE SAME

FIELD OF THE DISCLOSURE

This disclosure relates generally to machine learning, and, more particularly, to edge devices utilizing personalized machine learning and methods of operating the same.

BACKGROUND

In recent years, personalized artificial intelligence (AI) systems that operate within the home have become readily available. These AI systems perform tasks such as answering questions using voice recognition, performing searches, placing online orders, etc. However, there are also widespread concerns with privacy implications of these AI systems. For example, these AI systems remain on continuously, and can either deliberately and/or inadvertently record spoken conversation within the home and upload such recordings to online systems. Such recordings and/or other data are effectively out of the control of the user.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
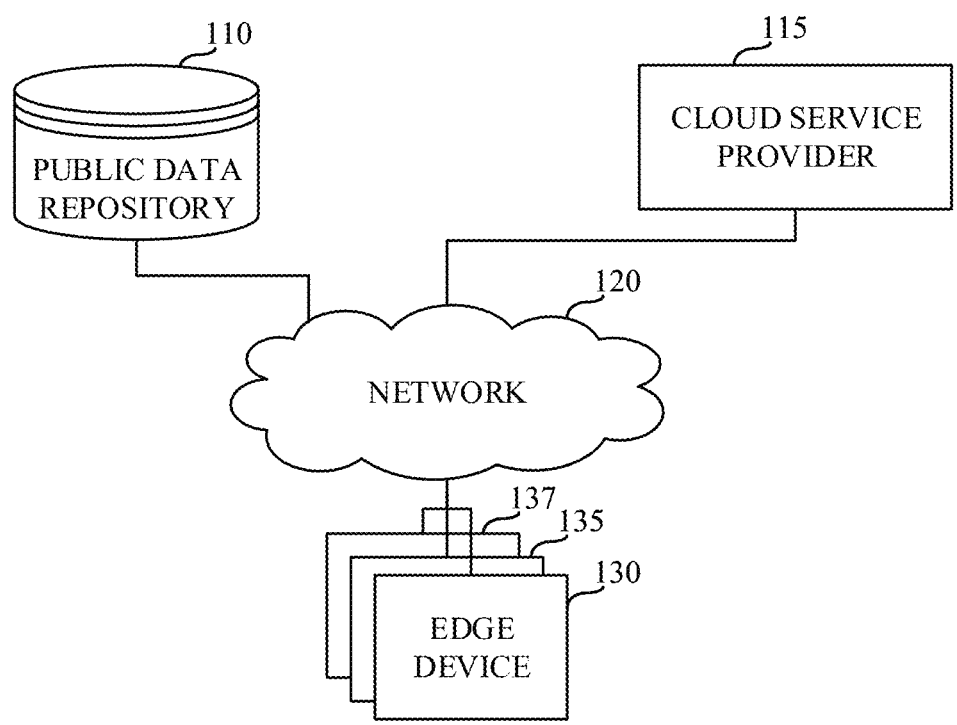
FIG. 1 is a block diagram of an example environment of use showing an edge device constructed in accordance with teachings of this disclosure and structured to leverage a locally trained, personalized machine learning model.

Machine learning is an important enabling technology for the revolution currently underway in artificial intelligence, driving truly remarkable advances in fields such as object detection, image classification, speech recognition, natural language processing, and many other areas. Training of a machine learning system is an expensive computational process dependent on collecting and processing large amounts of data. Such training is often performed by (and/or at the request of) a cloud service provider in order to ensure the model is robust. This training often requires many training iterations until an acceptable level of training error is reached. Millions of training iterations might be needed to arrive at a global minimum error.

Because large amounts of user data are needed to produce accurate models, cloud service providers often collect large amounts of user data. While the data is initially collected to train the model, such data can be used for purposes that the user may be unaware of. For example, cloud service providers may sell the data to advertisers in order to produce targeted advertisements. Accordingly, model training based on consumer data raises privacy issues. Moreover, such models are generic to all data used to train the model(s). Thus, a user who speaks with a particular dialect might not be well-recognized by the model since the majority of the data used to train the model may not reflect the dialect.

In examples disclosed herein, local training is utilized to train a model. Such local training does not require user data to be automatically provided to the cloud service provider. Moreover, such an approach advantageously trains the machine learning model to better understand the local user, as the model is trained based on local user data. Therefore, if the user has a dialect, the model will be trained based on that dialect.

In examples disclosed herein, personalized AI utilizes permissions configured by a user to place constraints on what data is shared with a third party such as a cloud provider or training service, and what data is not shared. The constraints can be set such that non-shared information cannot be accessed by any untrusted users. Such constraints may include, for example, times of the day during which data can be collected and/or shared, voice activation for certain controls limited to specific users and/or groups of users (e.g., users above an age threshold, users below an age threshold, etc.), etc. In some examples, the constraints may be configured such that no data is shared. Further, prior to sharing the locally collected data and/or locally trained model(s) trained upon such local data with a third party, such information is anonymized to ensure that the produced data cannot be traced back to the user(s).

In some examples, a local edge device (e.g., located in a consumer home) uses a machine learning model that has been trained based on a large data set and is then personalized with data collected from the specific users using that particular edge device. To further evolve the model and/or more, generally, the edge device for greater functionality, the local data (and/or locally-trained model) may be provided to an online repository in an anonymized form, such that the local data (and/or locally-trained model) may be exchanged with other users looking for similar functionality. In such an example, the local data (and/or locally-trained model) may be notated with user information that identifies some generic properties of the user(s) associated with that local data and/or locally trained model. As noted above, constraints can be placed on the data, thereby providing users with control over how (e.g., to what degree) and/or whether their data is shared.

In addition to users exchanging the data in the public repository (e.g., on a one-to-one basis), the users can also put the local data and/or locally trained model in a public repository which can then be used by a third party (e.g., a cloud service provider) to train further machine learning models. In such examples, the data is then not owned by the cloud service provider, but is merely used as an input for their machine learning models, which can then be provided to the users (e.g., as an update). In such an example, the use of machine learning models is not restricted for use by a single cloud provider, and thus has the potential to be less exploitative of user data.

FIG. 1 is a block diagram of an example environment of use in which an edge device constructed in accordance with teachings of this disclosure may operate to leverage a a personalized machine learning model. The illustrated example of FIG. 1 includes a public data repository 110, a cloud service provider 115, a network 120, and multiple edge devices 130, 135, 137 located, for example, in one or more consumer homes. The example edge device(s) 130, 135, 137 access machine learning model(s) provided by the example public data repository 110 and/or the cloud service provider 115, and use the machine learning model(s) to perform a task for a user of the edge device.

The example public data repository 110 of the illustrated example of FIG. 1 is implemented by any memory, storage device and/or storage disc for storing data such as, for example, flash memory, magnetic media, optical media, etc. Furthermore, the data stored in the public data repository 110 may be in any data format such as, for example, binary data, comma delimited data, tab delimited data, structured query language (SQL) structures, etc. While in the illustrated example the public data repository 110 is illustrated as a single device, the example public data repository 110 and/or any other data storage devices described herein may be implemented by any number and/or type(s) of memories. In the illustrated example of FIG. 1, the public data repository 110 stores data and/or models provided, collected, and/or locally trained by the example edge device(s) 130, 135, 137. The edge devices 130, 135, 137 review the local data and/or the machine learning models as well as anonymize the local data and/or the machine learning models prior to transmission of the same to the example public data repository 110. Therefore, the public data repository 110 does not store private information.

The example data and/or machine learning models stored in the example public data repository 110 may be provided to the cloud service provider 115 via the network 120. As a result, the example cloud service provider 115 may use the data and/or machine learning models stored in the example public data repository 110 for the creation of new and/or improved machine learning models that may be then provided to the example edge devices 130, 135, 137. Because the data and/or machine learning models accessible to the cloud service provider 105 was anonymized before being provided to the repository 110, the consumer's privacy is protected while the cloud service provider 115 is empowered to improve the models.

The example cloud service provider 115 of the illustrated example of FIG. 1 is implemented by one or more hardware servers that generate machine learning model(s) for use by the edge device(s) 130, 135, 137. In examples disclosed herein, the cloud service provider 115 uses machine learning techniques to create models based on the data in the example public data repository 110. In examples disclosed herein, any machine learning techniques may be used to create any type of machine learning model. For example, neural networks, gradient averaging, linear regression, logistic regression, support vector machines, etc. may be used.

The network 120 of the illustrated example is a public network such as, for example, the Internet. However, any other network could be used. For example, some or all of the network 120 may be a company's intranet network (e.g., a private network), a user's home network, a public network (e.g., at a coffee shop). In examples disclosed herein, the network 120 transmits Ethernet communications. However, any other past, present, and/or future communication protocols may additionally or alternatively be used.

The example edge device(s) 130, 135, 137 of the example of FIG. 1 is implemented by a computing platform such as, for example an Internet of Things (IoT) device, a smartphone, a personal computer, etc. In examples disclosed herein, the example edge devices may be utilized by any type of entity such as, for example, a corporate institution, a bank, a government, a consumer, an individual, a family, an end user, etc. In some examples, a large number of edge devices are used (e.g., thousands of devices). However, any number of edge devices may additionally or alternatively be used.

Figure 2:
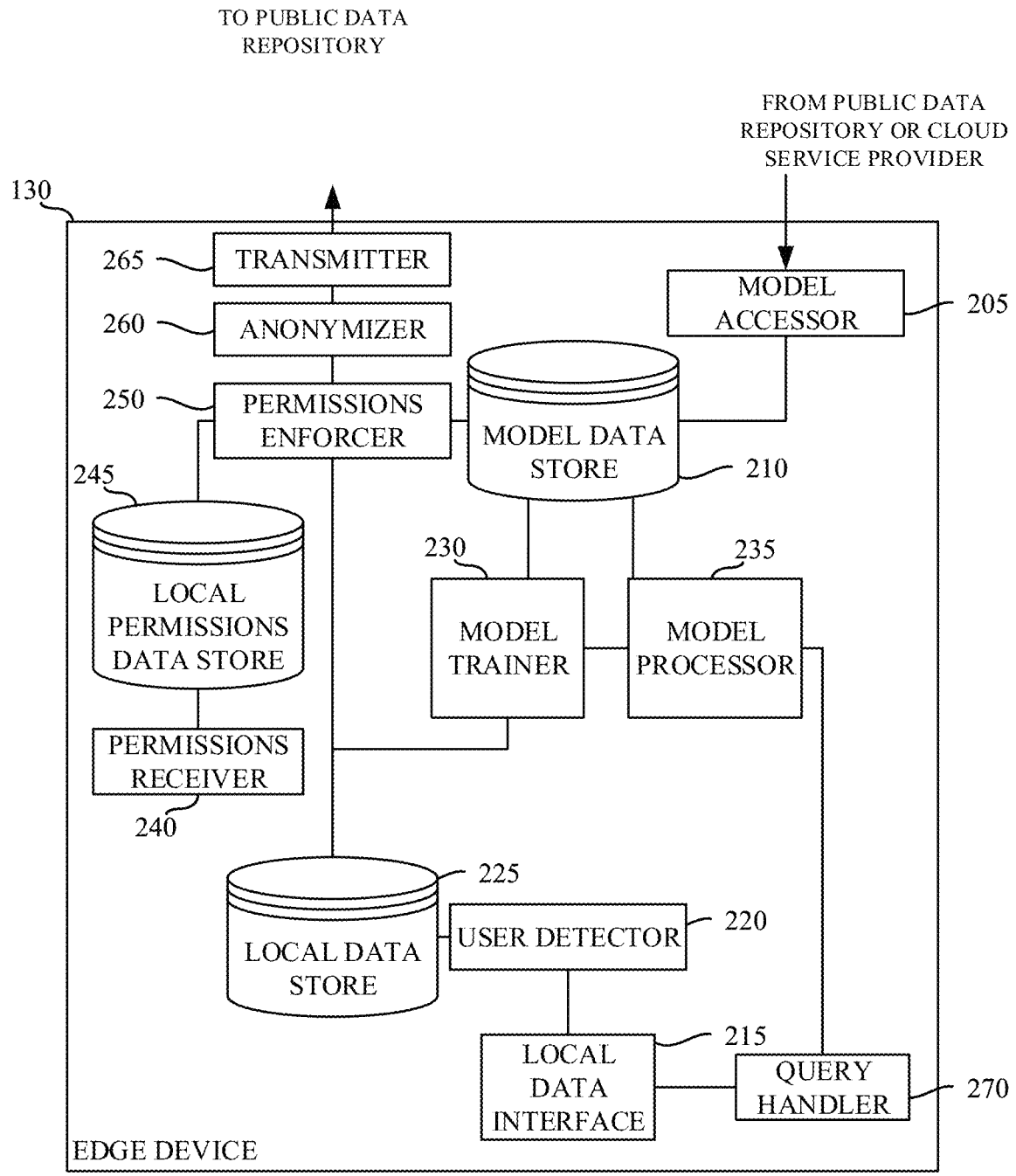
FIG. 2 is a block diagram of an example implementation of the example edge device of FIG. 1.

FIG. 2 is a block diagram of an example implementation of the example edge device 130 of FIG. 1. The example edge device 130 of the illustrated example of FIG. 2 includes a model accessor 205, a model data store 210, a local data interface 215, a user detector 220, a local data store 225, a model trainer 230, a model processor 235, a permissions receiver 240, a local permissions data store 245, a permissions enforcer 250, an anonymizer 260, a transmitter, and a query handler 270.

The example model accessor 205 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), Application Specific Integrated Circuit(s) (ASIC(s)), programmable logic device(s) (PLD(s)) and/or field programmable logic device (s) (FPLD(s)), programmable controller(s), graphics processing unit(s) (GPU(s)), digital signal processor(s) (DSP (s)), etc. The example model accessor 205 retrieves and/or otherwise accesses a machine learning model, and stores the retrieved model in the example model data store 210. In examples disclosed herein, the example model accessor 205 retrieves the model from the public data repository 110 or the cloud service provider 115. The retrieved machine learning model may be used by the example model processor 235 to produce an output instructing the query handler 270 to perform an action responsive to a user input.

The example model data store 210 of the illustrated example of FIG. 2 is implemented by any memory, storage device and/or storage disc for storing data such as, for example, flash memory, magnetic media, optical media, etc. Furthermore, the data stored in the example model data store 210 may be in any data format such as, for example, binary data, comma delimited data, tab delimited data, structured query language (SQL) structures, etc. While in the illustrated example the example model data store 210 is illustrated as a single device, the example model data store 210 and/or any other data storage devices described herein may be implemented by any number and/or type(s) of memories. In the illustrated example of FIG. 2, the example model data store 210 stores machine learning models trained locally at the example edge device 130 and/or models retrieved from the example cloud service provider 115 and/or public data repository 110.

The example local data interface 215 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example local data interface 215 collects local data at the edge device 130. The example local data may be any type of input data for use with a machine learning model including, for example, audio (e.g., ambient audio, audio of a user speaking in proximity of the edge device 130), video, textual information (e.g., input received via keyboard and/or a touchscreen), button inputs, and/or any other type of local data.

The example user detector 220 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example user detector 220 identifies one or more user(s) associated with the local input data. In examples disclosed herein, the user is identified using speech recognition techniques. However, any other approach for identifying a user may additionally or alternatively be used. For example, the user may be prompted to confirm their identity to the edge device 130. In other examples, the user may be recognized via facial detection using a camera or the like. The user detector 220 of this example stores the local data (including the identified user information) in the local data store 225.

The local data store 225 of the example of FIG. 2 is implemented by any memory, storage device and/or storage disc for storing data such as, for example, flash memory, magnetic media, optical media, etc. Furthermore, the data stored in the example local data store 225 may be in any data format such as, for example, binary data, comma delimited data, tab delimited data, structured query language (SQL) structures, etc. While in the illustrated example the example local data store 225 is illustrated as a single device, the example local data store 225 and/or any other data storage devices described herein may be implemented by any number and/or type(s) of memories. In the illustrated example of FIG. 3, the example local data store 225 stores local user data including, for example, audio (e.g., ambient audio, audio of a user speaking in proximity of the edge device 130), video, textual information (e.g., input received via keyboard and/or a touchscreen), button inputs, and/or any other type of local data.

The example model trainer 230 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example model trainer 230 performs training of the model stored in the model data store 225. In examples disclosed herein, training is performed using Stochastic Gradient Descent. However, any other approach to training a machine learning model may additionally or alternatively be used.

Figure 3:
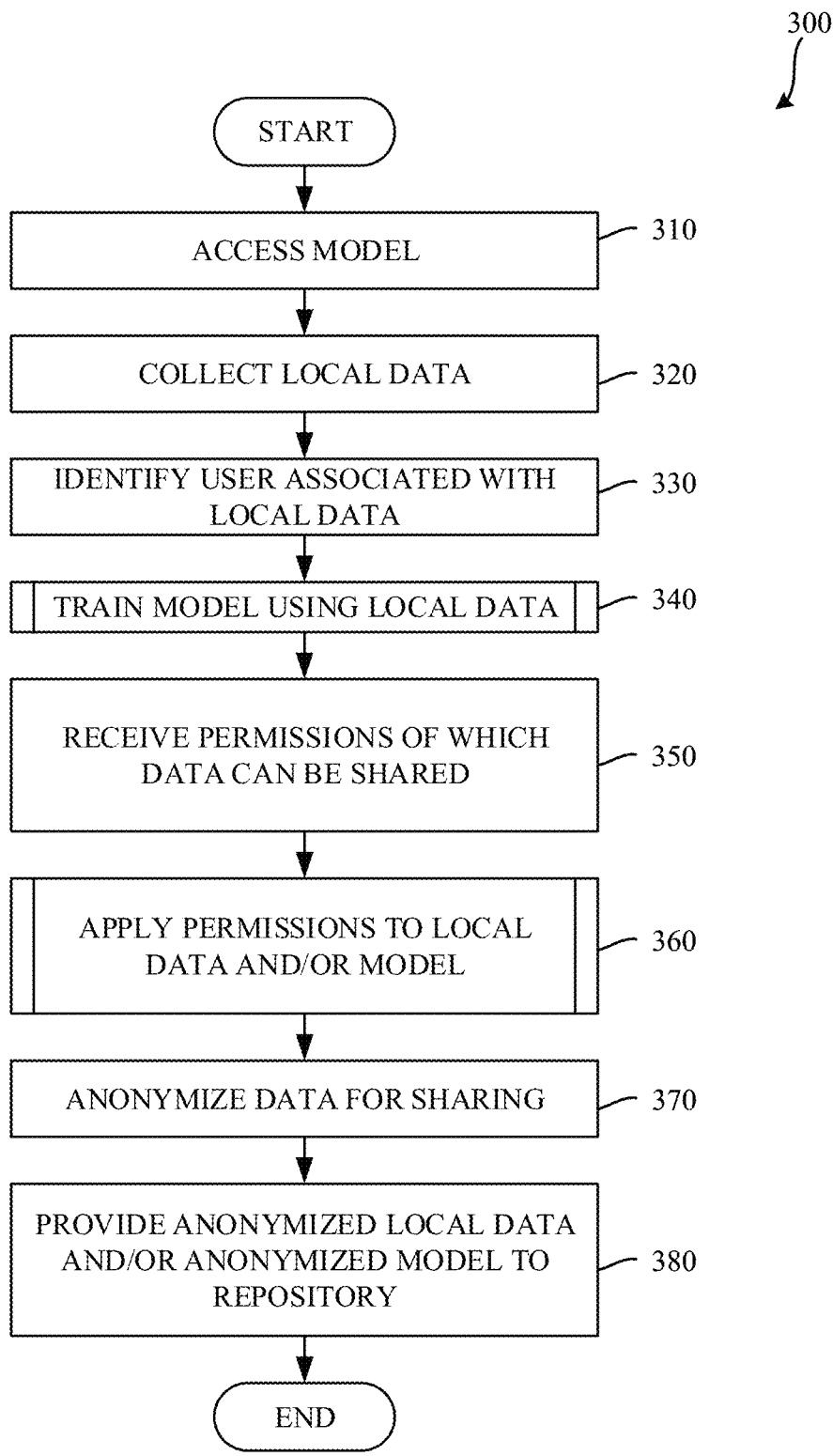
FIG. 3 is a flowchart representative of example machine readable instructions which may be executed to implement the example edge device of FIGS. 1 and/or 2 to provide anonymized data to the example public data repository of FIG. 1.

The example model processor 235 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example model processor 235 implements a machine learning model (e.g., a neural network) according to the model information stored in the model data store 225. The example machine learning model of the illustrated example of FIG. 3 is a deep neural network (DNN). However, any other past, present, and/or future machine learning topology (ies) and/or architecture(s) may additionally or alternatively be used such as, for example, a convolutional neural network (CNN), a feed-forward neural network.

The example permissions receiver 240 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example permissions receiver 240 receives permissions information from a user of the edge device 130. In examples disclosed herein, the permissions are received via a user input (e.g., an audible command, a button, a keyboard, a touchscreen, etc.). The example permissions receiver 240 stores the received permissions in the local permissions data store 245.

As used herein, permissions are defined to be constraints that are applied to the local data and/or machine learning model prior to sharing the local data and/or machine learning model outside of the edge device 130. That is, the constraints are set such that non-shared information is not shared with and, as a result, cannot be accessed by, any external (e.g., untrusted) users and/or systems. The permissions may, this, be implemented by metadata and/or flags associated with data and represent limitations on the usage of the data, if any.

An example of a constraint for sharing purposes includes times of day during which data can be collected for sharing (e.g., excluding data collected during times when children are expected to be home and/or otherwise in the presence of the edge device, data collected during a party, etc.). Other constraints may pertain to, for example, particular user(s) and/or groups of user(s) whose data may not be shared (e.g., do not share data generated by or associated with Elizabeth). In some examples, application of such constraints might not involve identifying a particular individual, but rather may involve determining a type of the user (e.g., a middle-aged male, a child, etc.) and applying permissions based on the determined type of the user. In some examples, such constraints and/or property of the user(s) may be used in combination with each other. For example, sharing of data may be restricted for a particular user when that data is collected during a particular time period (e.g., between five and seven PM). In some examples, permissions may be configured such that no data is shared.

The example local permissions data store 245 of the illustrated example of FIG. 2 is implemented by any memory, storage device and/or storage disc for storing data such as, for example, flash memory, magnetic media, optical media, etc. Furthermore, the data stored in the example local permissions data store 245 may be in any data format such as, for example, binary data, comma delimited data, tab delimited data, structured query language (SQL) structures, etc. While in the illustrated example the example local permissions data store 245 is illustrated as a single device, the example local permissions data store 245 and/or any other data storage devices described herein may be implemented by any number and/or type(s) of memories. In the illustrated example of FIG. 2, the example local permissions data store 245 stores permissions received by the example permissions receiver 240.

The example permissions enforcer 250 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example permissions enforcer 250 applies the permissions stored in the local permissions data store 225 to the local data stored in the local data store 225 and/or the machine learning model stored in the example model data store 210 to determine what, if any, information is eligible for sharing outside of the edge device 130. As a result, the permissions enforcer 250 acts as a filter, ensuring that local data and/or models that do not meet the sharing constraints specified by the user are not shared outside of the edge device. The permissions enforcer 250 may apply the permissions (e.g., flag data) as it is collected based on one or more parameters such as, for example, time of day, person detected o be present when the data is collected, etc.

The example anonymizer 260 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The anonymizer 260 of this anonymizes the data for sharing outside of the edge device. In examples disclosed herein, the anonymizer 260 removes personally identifying information included in the local data and/or machine learning model. For example, user identifiers generated by the user detector 220 are removed to preserve the anonymity of the users. In some examples, some information about the user(s) is allowed to remain such as, for example, a type of the user (e.g., middle-aged male), a time at which the data was collected, etc. In some examples, the example anonymizer 260 alters the data (e.g., modifies collected audio) to reduce the likelihood that any particular user could be identified based on their local data (e.g., based on their voices. In some examples, the anonymizer 260 removes identifying information associated with the edge device 130 (e.g., hardware addresses, device identifiers, IP addresses, network addresses, etc.) from the local data and/or the machine learning model.

The example transmitter 265 of this example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example transmitter 265 provides the anonymized local data and/or anonymized model to the public data repository 110. Because it is devoid of personally identifying information (PII), the data from the public data repository 110 may be shared with other third parties without fear of the data being traced back to the individual user, location of data collection, and/or individual edge device 130.

The example query handler 270 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example query handler 270 handles queries received based on user input. The example query handler processes the user input to format the user input (e.g., processes an audio recording using speech recognition) into a format usable by the model processor 235 (e.g., text). The example query handler 270 passes the query to the model processor 235, and receives a result indicating a responsive action to be taken. In some examples, the response may include instructing the query handler 270 to, for example, output audio, place an order, interact with a home automation system, etc. In examples disclosed herein, the example query handler 270 provides an indication of the responsive action to a query source (e.g., an application that submitted the local data as the query). However, in some examples, the example query handler 270 directly performs the responsive action and/or otherwise causes the responsive action to be performed.

While an example manner of implementing the example edge device 130 of FIG. 1 is illustrated in FIG. 2, one or more of the elements, processes and/or devices illustrated in FIG. 2 may be combined, divided, re-arranged, omitted, eliminated and/or implemented in any other way. Further, the example model accessor 205, the example model data store 210, the example local data interface 215, the example user detector 220, the example local data store 225, the example model trainer 230, the example model processor 235, the example permissions receiver 240, the example local permissions data store 245, the example permissions enforcer 250, the example anonymizer 260, the example transmitter 265, the example query handler 270, and/or, more generally, the example edge device 130 of FIGS. 1 and/or 2 may be implemented by hardware, software, firmware and/or any combination of hardware, software and/or firmware. Thus, for example, any of the example model accessor 205, the example model data store 210, the example local data interface 215, the example user detector 220, the example local data store 225, the example model trainer 230, the example model processor 235, the example permissions receiver 240, the example local permissions data store 245, the example permissions enforcer 250, the example anonymizer 260, the example transmitter 265, the example query handler 270, and/or, more generally, the example edge device 130 of FIGS. 1 and/or 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example model accessor 205, the example model data store 210, the example local data interface 215, the example user detector 220, the example local data store 225, the example model trainer 230, the example model processor 235, the example permissions receiver 240, the example local permissions data store 245, the example permissions enforcer 250, the example anonymizer 260, the example transmitter 265, the example query handler 270, and/or, more generally, the example edge device 130 of FIGS. 1 and/or 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example edge device 130 of FIGS. 1 and/or 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
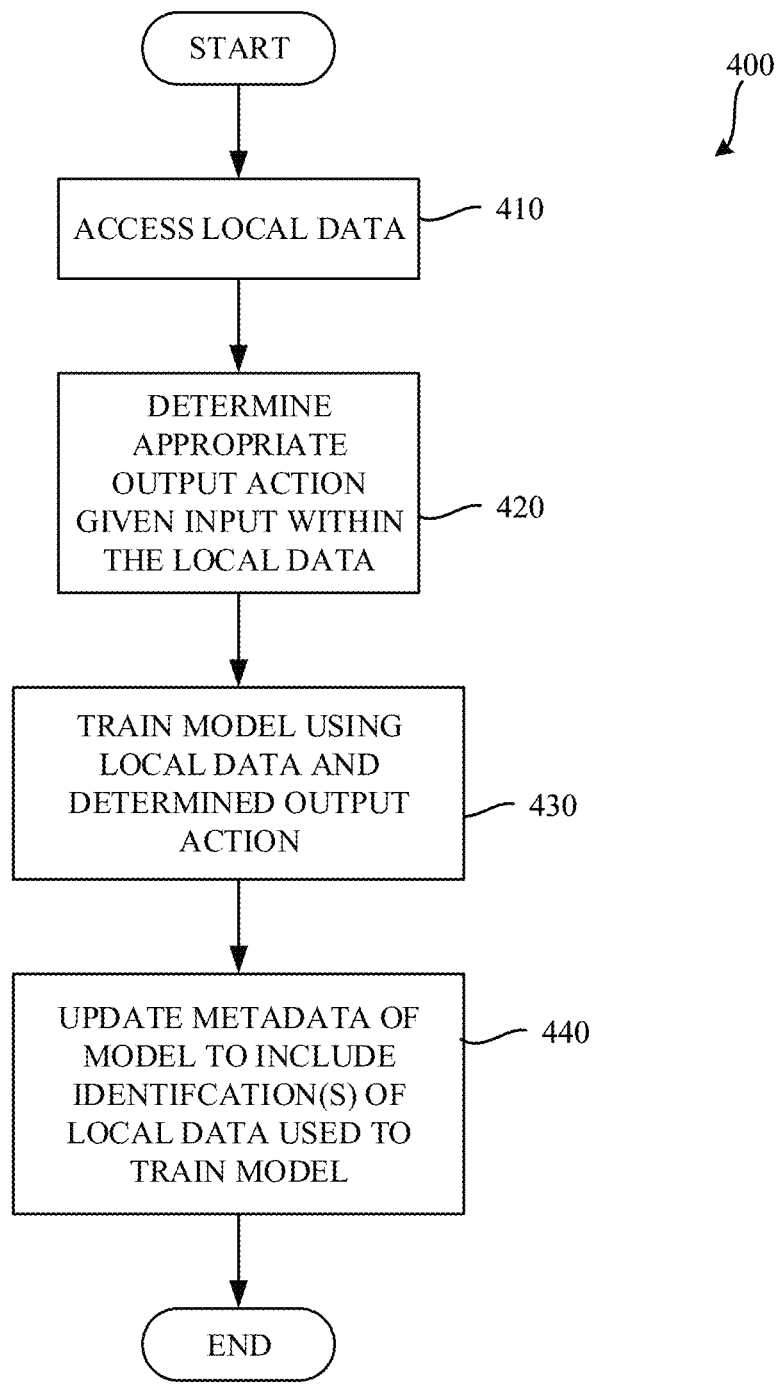
FIG. 4 is a flowchart representative of example machine readable instructions which may be executed to implement the example edge device of FIGS. 1 and/or 2 to train a machine learning model using local data.
Figure 5:
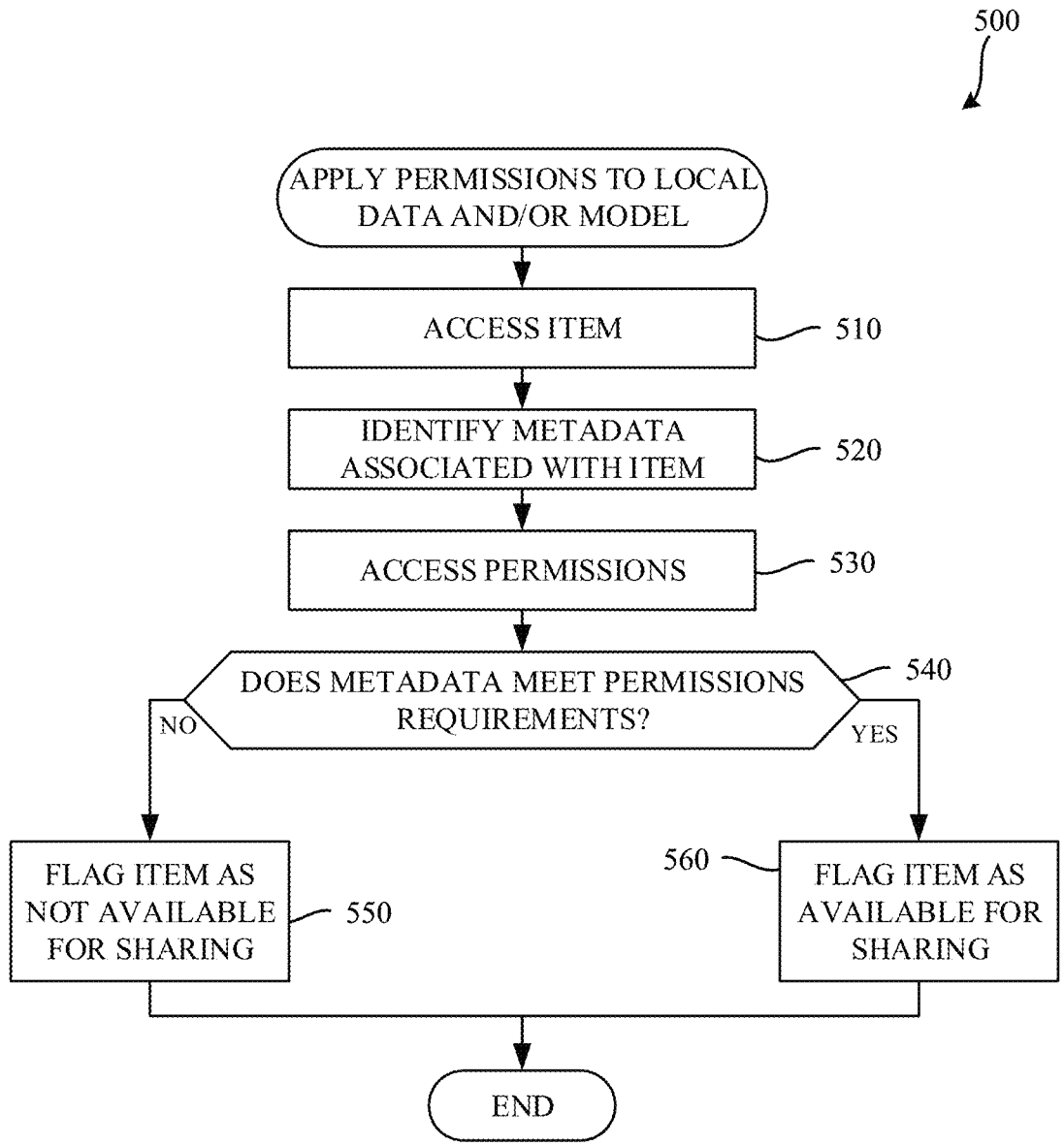
FIG. 5 is a flowchart representative of example machine readable instructions which may be executed to implement the example edge device of FIGS. 1 and/or 2 to apply permissions to local data and/or a model.

Flowcharts representative of example hardware logic, machine readable instructions, hardware implemented state machines, and/or any combination thereof for implementing the example edge device 130 of FIGS. 1 and/or 2 are shown in FIGS. 3, 4, 5, and/or 6. The machine readable instructions may be an executable program(s) or portion of an executable program for execution by a computer processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIGS. 3, 4, 5, and/or 6, many other methods of implementing the example edge device 130 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 3, 4, 5, and/or 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

As used in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 3 is a flowchart representative of machine readable instructions which may be executed to implement the example edge device 130 of FIGS. 1 and/or 2 to provide anonymized data to the example public data repository 110 of FIG. 1. The example process 300 of FIG. 3 begins when the example model accessor 205 retrieves and/or otherwise accesses a machine learning model. (Block 310). The example model accessor 205 stores the retrieved model in the example model data store 210. The example model accessor 205 retrieves the model from the public data repository 110 or the cloud service provider 115.

In examples where the model is retrieved from the public data repository 110, the model may have been produced by another edge device. That is, to further evolve the machine learning models, users may present their local data and/or machine learning model in an online exchange (e.g., in the data repository 110 its anonymized form) to exchange with other users looking for similar functionality. This exchange can thus provide users control over how their data is being used for training purposes.

Machine learning models are generic to the training data used to create the machine learning model. That is, the machine learning model, when trained using data collected from multiple different users, is generic to those multiple different users. In example approaches disclosed herein, the machine learning model produced on a generic data set can be further personalized using local data to create a machine learning model that is specific to the particular user and/or group of users.

To this end, the example local data interface 215 collects local data at the edge device 130. (Block 320). The example local data may be any type of input data for use with training or querying a machine learning model including, for example, audio (e.g., ambient audio, audio of a user speaking in proximity of the edge device 130), video (e.g., data received via a camera), textual information (e.g., input received via keyboard and/or a touchscreen), button inputs, and/or any other type of local data.

The example user detector 220 identifies one or more user(s) associated with the local input data. (Block 330). In examples disclosed herein, the user is identified using speech recognition techniques. However, any other approach for identifying a user may additionally or alternatively be used. For example, the user may be prompted to confirm their identity to the edge device and/or facial recognition techniques may be used. The example user detector 220 stores the local data (including the identified user information) in the local data store 225.

The example model trainer 230 trains the model stored in the example model data store 210 based on the local user data. (Block 340). An example approach to performing the training of the machine learning model using local data is described in further detail in connection with FIG. 4. As a result of the training, a personalized machine learning model is created that may be used by the edge device to more accurately provide results to a user (e.g., in response to a user query and/or other input).

The example permissions receiver 240 receives permissions information from a user of the edge device 130. (Block 350). In examples disclosed herein, the permissions are received via a user input (e.g., an audible command, a button, a keyboard, a touchscreen, etc.). The example permissions receiver 240 stores the received permissions in the local permissions data store 245. As noted above, the permissions represent constraints that are applied to the local data and/or machine learning model prior to sharing the local data and/or machine learning model outside of the edge device 130. That is, the constraints are set such that information based on non-shared information is not shared with and, as a result, cannot be accessed by, any external (e.g., untrusted) users and/or systems.

The example permissions enforcer 250 of this example applies the permissions stored in the local permissions data store 225 to the local data stored in the local data store 225 and/or the machine learning model stored in the example model data store 210. (Block 360). As a result, the permissions enforcer 250 acts as a filter, ensuring that local data and/or models that do not meet the sharing constraints specified by the user are not shared outside of the edge device. Further detail concerning the application of the permissions to the local data and/or the machine learning model is described in connection with FIG. 5. The example permissions enforcer 250 provides the local data and/or model(s) available for sharing to the anonymizer 260. That is, items that are not available for sharing are not provided to the example anonymizer 260. However, in some examples, the data may be provided to the anonymizer 260 with an indication of whether the data may be shared, such that the anonymizer 260 may discard items that are not available for sharing.

The example anonymizer 260 of this example anonymizes the data for sharing outside of the edge device. (Block 370). In examples disclosed herein, the anonymizer 260 removes personally identifying information (PII) included in the local data and/or machine learning model. For example, user identifiers and/or other user identifying information (e.g., IP addresses, device names, metadata, etc.) generated by the user detector 220 are removed to preserve the anonymity of the users. In some examples, some information about the user(s) is allowed to remain such as, for example, a type of the user (e.g., middle-aged male), a time at which the data was collected, etc. In some examples, the example anonymizer 260 alters the data (e.g., modifies collected audio) to reduce the likelihood that any particular user could be identified based on their local data. In some examples, the anonymizer 260 removes identifying information associated with the edge device 130 (e.g., hardware addresses, device identifiers, etc.) from the local data and/or the machine learning model.

The example transmitter 265 of this example then provides the anonymized local data and/or anonymized model to the public data repository 110. (Block 380). The data may be shared from the public data repository 110 with other third parties without fear of the data being traced back to the individual user and/or individual edge device 130.

Moreover, the machine learning model may be shared from the public data repository 110, with other users in its anonymized form to enhance the functionality of other users. For example, a machine learning model uploaded by a user speaking with a dialect originating from the Southern United States may be shared with other users. As a result, those other users that speak with a similar dialect may benefit from the use of the machine learning model trained using their particular dialect.

Further, from the public data repository 110, the machine learning model and/or the local data may be shared with the cloud service provider 115. Such an approach enables the cloud service provider 115 to develop further machine learning models. In such an approach, the local data and/or machine learning model(s) stored in the public data repository 110 are not owned by the cloud service provider 115, but rather, can be used as an input for the cloud service provider 115 (and/or other cloud service providers). The updated machine learning models created by the cloud service provider 115 may then be redistributed back to the edge device 130.

FIG. 4 is a flowchart representative of example machine readable instructions 400 which may be executed to implement the example edge device 130 of FIGS. 1 and/or 2 to train a machine learning model using local data. The example process 400 of FIG. 4 is an example implementation of block 340 of FIG. 3. The example process 400 of FIG. 4 begins when the example model trainer 230 accesses local data stored in the local data store 225 that is to be used during training of the model. (Block 410).

The example model trainer 230 determines, given the local input data, an appropriate response. (Block 420). In some examples, the response may include instructing the query handler 270 to, for example, output audio, place an order, interact with a home automation system, etc.

In examples disclosed herein, the model trainer 230 of the example edge device 130 instructs the model processor 235 to train using the local data and the response. (Block 430). During training, the example model trainer 230 updates the model stored in the model data store 210 to reduce an amount of error generated by the example model processor 235 when using the local data to attempt to correctly output the desired response. As a result of the training, a model update is created and is stored in the model data store 210. In examples disclosed herein, the model update can be computed with any sort of model learning algorithm such as, for example, Stochastic Gradient Descent.

The example model trainer 230 then stores metadata in the example model data store 210 in association with the updated model to include identifications of local data (and/or information associated with the local data such as, for example, information about a user associated with the local data). The example metadata enables a later determination by the permissions enforcer 250 of whether the updated model should be shared. In some examples, reverse engineering attacks might be used to decipher input data from the resultant model. By storing metadata in association with the updated model, the example permissions enforcer can reduce the risk of reverse engineering attacks by preventing sharing of machine learning models that were trained on data that would otherwise not be shared.

FIG. 5 is a flowchart representative of example machine readable instructions which may be executed to implement the example edge device of FIGS. 1 and/or 2 to apply permissions to local data and/or a model. The example process of 500 the example of FIG. 5 begins when the example permissions enforcer 250 accesses an item (e.g., local data or a portion thereof, a machine learning model or a portion thereof, etc.). (Block 510). In examples disclosed herein, when the item is local data, the item is accessed in the local data store 225. In contrast, when the item is a machine learning model (e.g., a machine learning model trained by the model trainer 230 based on local data), the machine learning model is accessed in the model data store 210.

The example permissions enforcer 250 accesses metadata associated with the accessed item. (Block 520). In examples disclosed herein, in the context of metadata associated with local data, the metadata may represent, for example, a time at which the data was collected, a user and/or properties of a user (e.g., age, sex, etc.) identified in association with the collected data, a type of the local data (e.g., image data, audio data, text input, etc.), or any other property of the local data. In the context of metadata associated with locally created machine learning model(s), the metadata may represent, for example, a time when the machine learning model was created, information about a prior version of the machine learning model (e.g., a source of the prior version of the machine learning model), information about the local data used to train the machine learning model, etc.

The example permissions enforcer 250 accesses the permissions stored in the example local permissions data store 245. (Block 530). As noted above, the permissions represent constraints on what information or types of information can be shared outside of the edge device. The example permissions enforcer 250 compares the permissions with the metadata associated with the item to determine whether the item should be allowed to be shared. (Block 540). For example, the permissions may indicate that audio recordings that are associated with a child are not to be shared outside of the edge device 130. In such an example, if the local data were an audio recording that was associated with a child (and perhaps also associated with another user), the local data would not be identified as available for sharing because it did not meet the permissions constraints. As a further example, if a machine learning model were trained based on the audio recording associated with the child, in some examples, that machine learning model would be restricted from sharing as a result of the association with the child.

If the item does not meet the permissions requirements (e.g., block 540 returns a result of NO), the example permissions enforcer 250 flags the item (e.g., stores an indication) as not available for sharing. (Block 550). If the item does meet the permissions requirements (e.g., block 540 returns a result of YES), the example permissions enforcer 250 flats the item as available for sharing. (Block 560). In some examples, instead of flagging the item (e.g., storing an indication of whether the item is available for sharing), the permissions enforcer may provide only those items that are available for sharing to the anonymizer 260. The example process of FIG. 5 then terminates.

Figure 6:
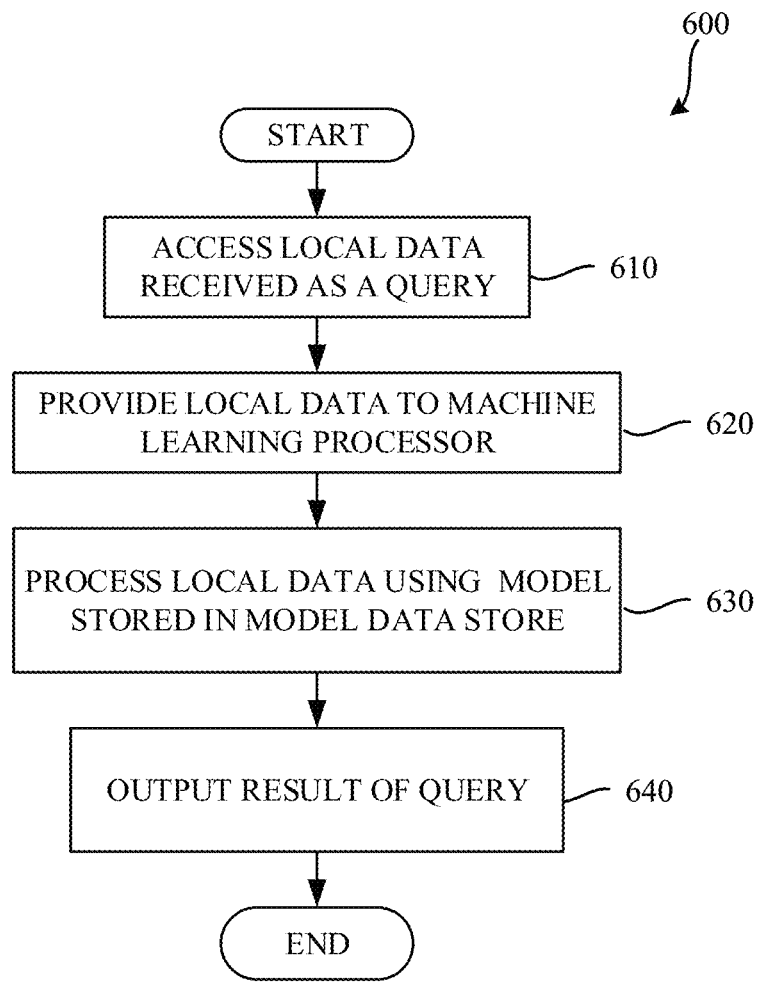
FIG. 6 is a flowchart representative of machine readable instructions which may be executed to implement the example edge device of FIGS. 1 and/or 2 to generate an output based on local data.

FIG. 6 is a flowchart representative of machine readable instructions which may be executed to implement the example edge device 130 of FIGS. 1 and/or 2 to generate an output based on local data. The example process 600 the illustrated example of FIG. 6 begins when the example query handler 270 accesses a query including local data received via the local data interface 215. (Block 610).

The example query handler 270 instructs the model processor 235 to process the local data using the model (and/or the updated model, if available) stored in the example model data store 210. (Block 630). The example model processor 235 determines a responsive action that should be taken in response to the received local data. Such responsive action may include, for example, playing a song, interfacing with a web service, placing an online order, instructing a home automation system to turn on a light, etc.

Upon completion of the processing of the input data to determine a responsive action to be taken, the example query handler 270 outputs a result of the query identifying the responsive action to be taken. (Block 640). In examples disclosed herein, the example query handler 270 provides an indication of the responsive action to a query source (e.g., an application that submitted the local data as the query). However, in some examples, the example query handler 270 directly performs the responsive action and/or otherwise causes the responsive action to be performed. The example process 600 of the illustrated example of FIG. 6 then terminates. The example process 600 of the illustrated example of FIG. 6 may then be repeated upon subsequent receipt of a query.

Figure 7:
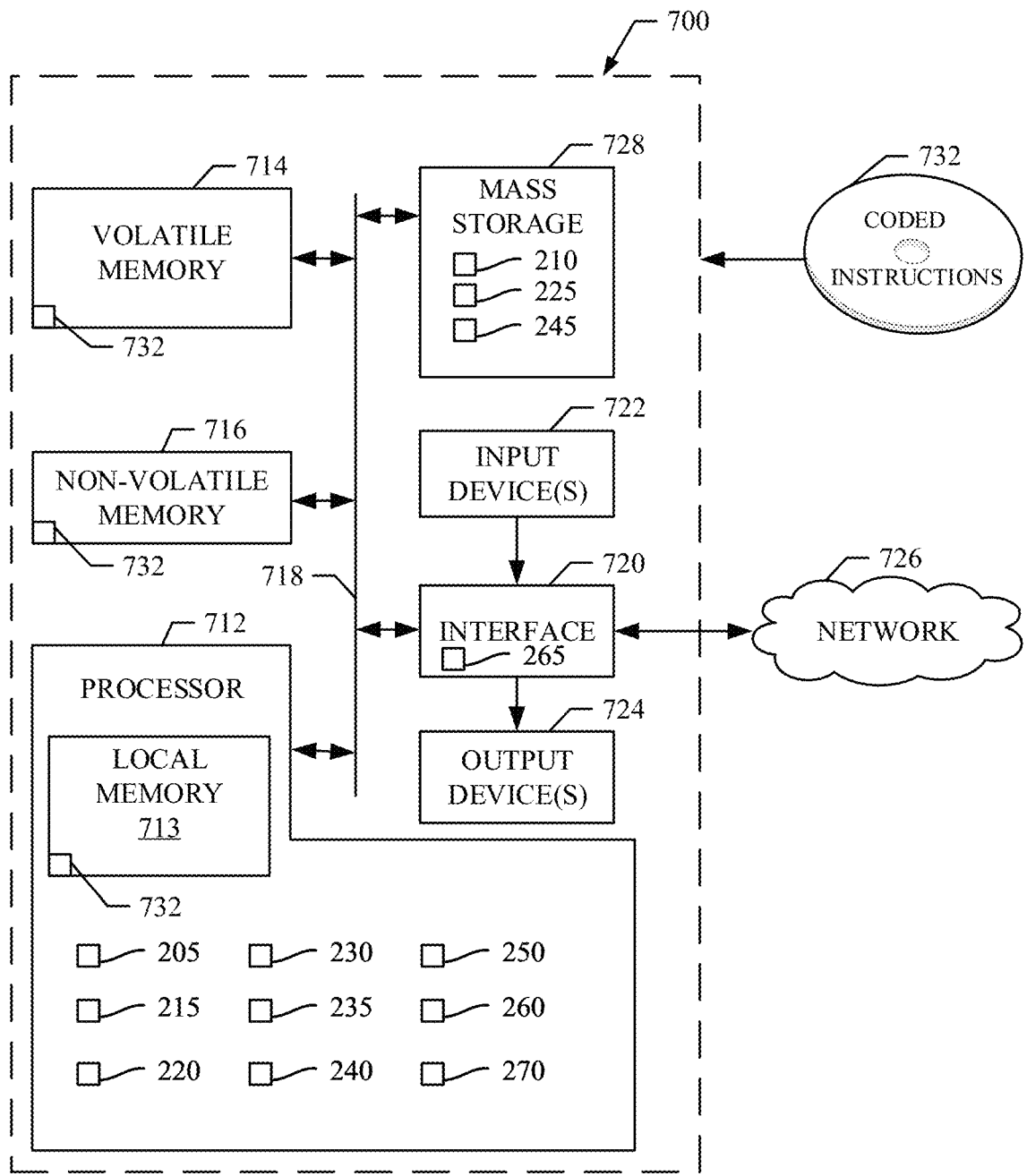
FIG. 7 is a block diagram of an example processing platform structured to execute the instructions of FIGS. 3, 4, 5, and/or 6 to implement the example edge device of FIG. 1.

FIG. 7 is a block diagram of an example processor platform 700 structured to execute the instructions of FIGS. 3, 4, 5, and/or 6 to implement the example edge device 130 of FIGS. 1 and/or 2. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example model accessor 205, the example local data interface 215, the example user detector 220, the example model trainer 230, the example model processor 235, the example permissions receiver 240, the example permissions enforcer 250, the example anonymizer 260, and/or the example query handler 270.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc. The example interface circuit 720 implements the example transmitter 265.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIGS. 3, 4, 5, and/or 6 may be stored in the mass storage device 728, in the volatile memory 714, in the non-volatile memory 716, and/or on a removable non-transitory computer readable storage medium such as a CD or DVD. In the illustrated example of FIG. 7, the example mass storage device 728 implements the example model data store 210, the example local data store 225, and the example local permissions data store 245.

From the foregoing, it will be appreciated that example methods, apparatus and articles of manufacture have been disclosed that enable machine learning models to be created and/or personalized based on local data while not supplying personal data to entities outside of the control of a user of an edge device. Disclosed methods, apparatus and articles of manufacture improve the efficiency of using a computing device by enabling machine learning models to be obtained from a public repository separate from a cloud service provider. In examples disclosed herein, the machine learning models retrieved from the public repository may be retrieved based on the similarity of other users of edge devices in connection with that machine learning model to a user of the edge device. Thus, a user of an edge device may obtain a machine learning model that is better suited for processing that user's local data than a machine learning model created based on data from all users. Moreover, example edge device(s) disclosed herein apply permissions to local data and/or machine learning models created based on that local data before allowing the machine learning model to be transmitted outside of the control of the user of the edge device. Disclosed methods, apparatus and articles of manufacture are accordingly directed to one or more improvement(s) in the functioning of a computer.

Example 1 includes an edge device for use of a personalized machine learning model, the edge device comprising a model accessor to access a first machine learning model from a cloud service provider, a local data interface to collect local user data, a model trainer to train the first machine learning model to create a second machine learning model using the local user data, a local permissions data store to store permissions indicating constraints on the local user data with respect to sharing outside of the edge device, a permissions enforcer to apply permissions to the local user data to create a sub-set of the local user data to be shared outside of the edge device, and a transmitter to provide the sub-set of the local user data to a public data repository.

Example 2 includes the edge device of example 1, further including an anonymizer to anonymize the sub-set of the local user data prior to the sub-set of the local user data being transmitted to the public data repository.

Example 3 includes the edge device of example 2, wherein the anonymizer is to anonymize the sub-set of the local user data by removing user-identifying data from the sub-set of the local user data.

Example 4 includes the edge device of example 1, wherein the permissions enforcer is further to determine whether to share the second machine learning model based on the permissions and metadata based on the local user data used to create the second machine learning model, the anonymizer to, in response to determining that the second machine learning model is to be shared, provide the second machine learning model to the public data repository.

Example 5 includes the edge device of example 4, further including an anonymizer to anonymize the second machine learning model prior to providing the second machine learning model to the public data repository.

Example 6 includes the edge device of example 1, further including a model processor to process query data using the second machine learning model to determine a responsive action to be performed.

Example 7 includes the edge device of example 6, further including a query handler to cause the performance of the responsive action.

Example 8 includes the edge device of example 6, wherein the public data repository is not operated by the cloud service provider.

Example 9 includes at least one non-transitory machine readable medium comprising instructions that, when executed, cause at least one processor to at least access a first machine learning model from a cloud service provider, collect local user data, train the first machine learning model to create a second machine learning model using the local user data, access permissions indicating constraints on the local user data concerning access to the local user data outside of the edge device, apply the permissions to the local user data to create a sub-set of the local user data to be shared outside of the edge device, and provide the sub-set of the local user data to a public data repository.

Example 10 includes the at least one non-transitory machine readable medium of example 9, wherein the instructions, when executed, further cause the at least one processor to anonymize the sub-set of the local user data prior to providing the sub-set of the local user data to the public data repository.

Example 11 includes the at least one non-transitory machine readable medium of example 10, wherein the instructions cause the at least one processor to anonymize the sub-set of the local user data by removing user-identifying data from the sub-set of the local user data.

Example 12 includes the at least one non-transitory machine readable medium of example 9, wherein the instructions, when executed, further cause the at least one processor to determine whether to share the second machine learning model based on the permissions and metadata associated with the local user data used to create the second machine learning model, and in response to determining that the second machine learning model is to be shared, provide the second machine learning model to the public data repository.

Example 13 includes the at least one non-transitory machine readable medium of example 12, wherein the instructions, when executed, further cause the at least one processor to anonymize the second machine learning model prior to providing the second machine learning model to the public data repository.

Example 14 includes the at least one non-transitory machine readable medium of example 9, wherein the instructions, when executed, further cause the at least one processor to process query data using the second machine learning model to determine a responsive action to be performed.

Example 15 includes the at least one non-transitory machine readable medium of example 14, wherein the instructions, when executed, further cause the at least one processor to perform the responsive action.

Example 16 includes the at least one non-transitory machine readable medium of example 9, wherein the public data repository is not operated by the cloud service provider.

Example 17 includes an edge device comprising means for accessing a first machine learning model from a cloud service provider, means for collecting local user data, means for training the first machine learning model to create a second machine learning model using the local user data, means for accessing permissions indicating constraints on the local user data with respect to sharing outside of the edge device, means for applying the permissions to the local user data to create a sub-set of the local user data to be shared outside of the edge device, and means for providing the sub-set of the local user data to a public data repository.

Example 18 includes the edge device of example 17, further including means for anonymizing the sub-set of the local user data prior to the sub-set of the local user data being provided to the public data repository.

Example 19 includes the edge device of example 18, wherein the means for anonymizing is to anonymize the sub-set of the local user data by removing of user-identifying data from the sub-set of the local user data.

Example 20 includes the edge device of example 17, wherein the means for applying is further to determine whether to share the second machine learning model based on the permissions and metadata based on the local user data used to create the second machine learning model, the means for providing to, in response to determining that the second machine learning model is to be shared, provide the second machine learning model to the public data repository.

Example 21 includes the edge device of example 20, further including means for anonymizing the second machine learning model prior to the second machine learning model being provided to the public data repository.

Example 22 includes the edge device of example 17, further including means for processing query data using the second machine learning model to determine a responsive action to be performed.

Example 23 includes the edge device of example 22, further including means for performing the responsive action.

Example 24 includes the edge device of example 17, wherein the public data repository is not operated by the cloud service provider.

Example 25 includes a method of using a personalized machine learning model, the method comprising accessing a first machine learning model from a cloud service provider, collecting, using a processor of an edge device, local user data, training the first machine learning model to create a second machine learning model using the local user data, accessing permissions indicating constraints on the local user data concerning access to the local user data outside of the edge device, applying the permissions to the local user data to create a sub-set of the local user data to be shared outside of the edge device, and providing the sub-set of the local user data to a public data repository.

Example 26 includes the method of example 25, further including anonymizing the sub-set of the local user data prior to providing the sub-set of the local user data to the public data repository.

Example 27 includes the method of example 26, wherein the anonymizing of the sub-set of the local user data includes removing user-identifying data from the sub-set of the local user data.

Example 28 includes the method of example 25, further including determining whether to share the second machine learning model based on the permissions and metadata associated with the local user data used to create the second machine learning model, and in response to determining that the second machine learning model is to be shared, providing the second machine learning model to the public data repository.

Example 29 includes the method of example 28, further including anonymizing the second machine learning model prior to providing the second machine learning model to the public data repository.

Example 30 includes the method of example 25, further including processing, at the edge device, query data using the second machine learning model to determine a responsive action to be performed.

Example 31 includes the method of example 30, further including performing the responsive action.

Example 32 includes the method of example 25, wherein the public data repository is not operated by the cloud service provider.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An edge device for use of a personalized machine learning model, the edge device comprising:
at least one memory;
machine readable instructions; and
a processor to execute the machine readable instructions to:
access a first machine learning model from a cloud service provider;
collect local user data;
train the first machine learning model to create a second machine learning model using the local user data;
store permissions indicating constraints on the local user data with respect to sharing outside of the edge device;
apply permissions to the local user data to create a sub-set of the local user data to be shared outside of the edge device;
determine whether to share the second machine learning model based on the permissions and metadata based on the local user data used to create the second machine learning model;

provide the sub-set of the local user data to a public data repository; and provide the second machine learning model to the public data repository in response to determining that the second machine learning model is to be shared.

2. The edge device of claim 1, wherein the processor is to execute the machine readable instructions to anonymize the sub-set of the local user data prior to the sub-set of the local user data being transmitted to the public data repository.

3. The edge device of claim 2, wherein the processor is to execute the machine readable instructions to anonymize the sub-set of the local user data by removing user-identifying data from the sub-set of the local user data.

4. The edge device of claim 1, wherein the processor is to execute the machine readable instructions to anonymize the second machine learning model prior to providing the second machine learning model to the public data repository.

5. The edge device of claim 1, wherein the processor is to execute the machine readable instructions to process query data using the second machine learning model to determine a responsive action to be performed.

6. The edge device of claim 5, wherein the processor is to execute the machine readable instructions to cause the performance of the responsive action.

7. The edge device of claim 5, wherein the public data repository is not operated by the cloud service provider.

8. At least one non-transitory machine readable medium comprising instructions that, when executed, cause at least one processor to at least:
    access a first machine learning model from a cloud service provider;
    collect local user data;
    train the first machine learning model to create a second machine learning model using the local user data;
    access permissions indicating constraints on the local user data concerning access to the local user data outside of an edge device;
    apply the permissions to the local user data to create a sub-set of the local user data to be shared outside of the edge device;
    determine whether to share the second machine learning model based on the permissions and metadata associated with the local user data used to create the second machine learning model;
    provide the sub-set of the local user data to a public data repository; and provide the second machine learning model to the public data repository in response to determining that the second machine learning model is to be shared.

9. The at least one non-transitory machine readable medium of claim 8, wherein the instructions, when executed, further cause the at least one processor to anonymize the sub-set of the local user data prior to providing the sub-set of the local user data to the public data repository.

10. The at least one non-transitory machine readable medium of claim 9, wherein the instructions, when executed, further cause the at least one processor to anonymize the sub-set of the local user data by removing user-identifying data from the sub-set of the local user data.

11. The at least one non-transitory machine readable medium of claim 8, wherein the instructions, when executed, further cause the at least one processor to anonymize the second machine learning model prior to providing the second machine learning model to the public data repository.

12. The at least one non-transitory machine readable medium of claim 8, wherein the instructions, when executed, further cause the at least one processor to process query data using the second machine learning model to determine a responsive action to be performed.

13. The at least one non-transitory machine readable medium of claim 12, wherein the instructions, when executed, further cause the at least one processor to perform the responsive action.

14. The at least one non-transitory machine readable medium of claim 8, wherein the public data repository is not operated by the cloud service provider.

15. An edge device comprising:
    means for accessing a first machine learning model from a cloud service provider;
    means for collecting local user data;
    means for training the first machine learning model to create a second machine learning model using the local user data;
    means for accessing permissions indicating constraints on the local user data with respect to sharing outside of the edge device;
    means for applying the permissions to the local user data to create a sub-set of the local user data to be shared outside of the edge device, the means for applying is further to determine whether to share the second machine learning model based on the permissions and metadata based on the local user data used to create the second machine learning model; and
    means for providing the sub-set of the local user data to a public data repository, the means for providing is further to, in response to determining that the second machine learning model is to be shared, provide the second machine learning model to the public data repository.

16. The edge device of claim 15, further including means for anonymizing the sub-set of the local user data prior to the sub-set of the local user data being provided to the public data repository.

17. The edge device of claim 16, wherein the means for anonymizing is to anonymize the sub-set of the local user data by removing of user-identifying data from the sub-set of the local user data.

18. The edge device of claim 15, further including means for anonymizing the second machine learning model prior to the second machine learning model being provided to the public data repository.

19. The edge device of claim 15, further including means for processing query data using the second machine learning model to determine a responsive action to be performed.

20. The edge device of claim 19, further including means for performing the responsive action.

21. The edge device of claim 15, wherein the public data repository is not operated by the cloud service provider.

22. A method of using a personalized machine learning model, the method comprising:
    accessing a first machine learning model from a cloud service provider;
    collecting, using a processor of an edge device, local user data;
    training the first machine learning model to create a second machine learning model using the local user data;
    accessing permissions indicating constraints on the local user data concerning access to the local user data outside of the edge device;
    applying the permissions to the local user data to create a sub-set of the local user data to be shared outside of the edge device;

determining whether to share the second machine learning model based on the permissions and metadata associated with the local user data used to create the second machine learning model;

providing the sub-set of the local user data to a public data repository; and providing the second machine learning model to the public data repository in response to determining that the second machine learning model is to be shared.

23. The method of claim 22, further including anonymizing the sub-set of the local user data prior to providing the sub-set of the local user data to the public data repository.

24. The method of claim 23, wherein the anonymizing of the sub-set of the local user data includes removing user-identifying data from the sub-set of the local user data.

25. The method of claim 22, further including anonymizing the second machine learning model prior to providing the second machine learning model to the public data repository.

26. The method of claim 22, further including processing, at the edge device, query data using the second machine learning model to determine a responsive action to be performed.

27. The method of claim 26, further including performing the responsive action.

28. The method of claim 22, wherein the public data repository is not operated by the cloud service provider.

* * * * *